2,860,155

PHOSPHINATES AND METHODS OF PREPARING SAME

Edward N. Walsh, Chicago Heights, Ill., assignor to Victor Chemical Works, a corporation of Illinois No Drawing. Application April 30, 1956
Serial No. 581,358

10 Claims. (Cl. 260—461)

This invention relates to a new class of phosphinates and methods of preparing same.

Broadly speaking, this new process describes a method of making these new phosphinates by reacting a phosphonite and a phosphinic acid. These compounds are reacted in stoichiometric quantities to produce the phosphinate in accordance with the following reaction:

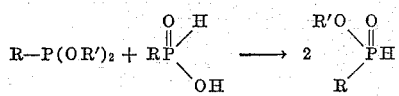

wherein R may be an alkyl, haloalkyl, alkenyl aryl or substituted aryl radical that is connected to the phosphorus atom through a phosphorus to carbon bond, and R' may be an alkyl, haloalkyl, alkenyl, aryl or substituted aryl radical.

In particular, the new class of compounds are the phenylphosphinates wherein R in the above formula is the phenyl radical $C_6H_5$—. For example, the following compounds may be made by my new process: Phenyl phenylphosphinate, phenyl chlorophenylphosphinate, beta - chloroethyl phenylphosphinate, cresyl phenylphosphinate, phenyl cresylphosphinate, ethyl phenylphosphinate, allyl phenylphosphinate, octyl phenylphosphinate, phenyl styryl phosphinate, ethyl isooctenylphosphinate, allyl chloromethanephosphinate, and numerous other similar compounds.

As can be seen from the foregoing equation, since no by-products are formed, the purity of the final phosphinate is dependent upon the completeness of the reaction and the stoichiometric accuracy of the amounts of reactants. Therefore, exact stoichiometric proportions are preferred. The proportions are not critical, however, as the reaction will proceed in the presence of an excess of either reactant. The product produced, however, will be contaminated with the excess reactant thus creating a physical separation problem.

The invention will be better understood by reference to the following illustrative examples.

Example 1

Phenyl phenylphosphinate was prepared by placing 291.4 g. of diphenyl phenylphosphonite and 140.7 g. of phenylphosphinic acid in a reaction flask. The mixture was warmed to 150° C. over a period of 65 minutes while stirring under an atmosphere of dry nitrogen. At 70° C. the phenyl phosphinic acid was completely dissolved. The reaction was completed by continued stirring at 150° C. for four hours. The resulting product, phenyl phenylphosphinate, weighed 430.0 g. and had an index of refraction $n_{25D}=1.5924$. It analyzed: 14.3% P (theory 14.2% P) and 99.3% phenyl phenylphosphinate (by titration).

Example 2

Beta-chloroethyl phenylphosphinate was prepared by reacting a suspension of 57.6 g. of phenyl phosphinic acid in 108 g. of bis-beta-chloroethyl phenylphosphonite. The mixture was warmed to 135° C. while stirring under an atmosphere of dry nitrogen. At 60° C., the phenyl phosphinic acid began to go into solution and it was completely dissolved at 75° C. The temperature reached 135° C. in 17 minutes. It was heated to 150° C. for a short time and then cooled to 135° C. and held for 90 minutes. The product was stabilized by holding for a short time under an absolute pressure of 2 mm. of mercury at 60° C. to yield 154.0 g. of beta-chloroethyl phenylphosphinate having an index of refraction $n_{25D}=1.5510$. This product analyzed: 15.2% P (theory 15.1% P), 17.5% Cl (theory 17.35% Cl), and 99.4% beta-chloroethyl phenylphosphinate (by titration).

Example 3

The i-octyl phenylphosphinate product was prepared by reacting a suspension of 42.8 g. of phenylphosphinic acid in 119.9 g. of di-i-octyl phenylphosphonite. The mixture was stirred under an atmosphere of carbon dioxide while warming to 135° C. over a period of 12 minutes. At 75–85° C. the phenylphosphinic acid had dissolved. The reaction was completed by holding at 130° C. for ninety minutes. It was then placed under reduced pressure to remove volatiles and cooled to 30° C. 161.0 g. of i-octyl phenylphosphinate resulted, having an index of refraction $n_{25D}=1.4988$. This product analyzed 12.2% P (theory 12.2% P) and 98.4% i-octyl phenylphosphinate (by titration).

The temperature at which these reactions take place is not critical. It should be high enough that the reactants form a solution and low enough that there is no decomposition of the reactants and/or product. Generally, the range of temperatures between 40° C. and 200° C. is satisfactory. As indicated in the examples, solution of the reactants is generally effected in the 50° to 70° C. range with the reaction being completed at about 100 to 160° C.

As shown in the examples, an inert atmosphere is preferably used in the reaction flask. This is not essential but gives improved results since most organic compounds have a tendency to oxidize at temperatures above 100° C. in the presence of air. Thus, improved yields result from the exclusion of air and moisture.

The time of reaction is not critical and will of course vary with the temperature. At the temperatures indicated, the reaction is usually complete in approximately one to four hours. Since no by-products are formed and no purification is usually necessary, it does not damage the phosphinate product if it is held at reaction temperatures after the reaction is complete. The actual endpoint of the reaction can be determined by sampling and analysis.

The phosphinic acids uesd in this new process are prepared by hydrolyzing the corresponding organic dihalophosphine as is well known in the art. Thus phenyl dichlorophosphine when hydrolyzed yields phenyl phosphinic acid. The phosphonite reactants, which are diesters of phosphinic acids, are similarly prepared by reacting an organic dihalophosphine with the corresponding alcohol or phenol. Generally, a hydrogen-chloride accepting condensing agent is used with an alcohol. In the case of the beta-chloroethyl esters, ethylene oxide is used instead of an alcohol.

The products of this invention are valuable intermediates which can be used to make well known useful compounds. Thus if a phosphinate of the present invention is reacted with a chlorinating agent the corresponding phosphonochloridate results. In the case of the octyl phenylphosphinate the reaction may be illustrated as follows:

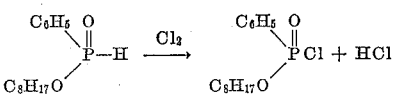

The resulting phosphonochloridate may then be reacted with an alcohol or phenol in the conventional manner to form a phosphonate diester. Such phosphonates are valuable compounds and may be used, for instance, as plasticizers as illustrated in U. S. Patent 2,471,463. They may also be used to make linear polyphosphonate resins as illustrated in U. S. Patent 2,682,522.

The above process is particularly desirable where a mixed diester, e. g., ethyl octyl phenyl phosphonate, is desired since a relatively pure phosphonochloridate is obtained for use as the starting material.

The foregoing detailed description has been given for clearness of understanding only, and no unnecessary limitations should be understood therefrom, as modifications will be obvious to those skilled in the art.

What is claimed is:

1. A method for making phosphinates of the formula

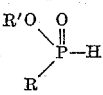

wherein R is a member of the class consisting of alkyl, haloalkyl, alkenyl, aryl, and substituted aryl radicals and R' is a member of the class consisting of alkyl, alkenyl, aryl, and chloroalkyl radicals, which comprises reacting a phosphonite of the formula $$R-P(OR')_2$$

with a phosphinic acid of the formula

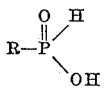

wherein R and R' are defined as above.

2. A method as set forth in claim 1 wherein R is aryl and R' is alkyl.
3. A method as set forth in claim 1 wherein R is aryl and R' is chloroalkyl.
4. A method as set forth in claim 1 wherein R is aryl and R' is aryl.
5. A method as set forth in claim 1 wherein R is phenyl.
6. A method as set forth in claim 1 wherein substantially stoichiometric quantities of reactants are used.
7. A method as set forth in claim 1 wherein substantially stoichiometric quantities of reactants are used, the reaction proceeds under an inert atmosphere, and a reaction temperature is employed which is high enough to form a solution of the reactants and low enough to avoid decomposition for a period of time sufficient to complete the reaction.
8. Phenylphosphinates of the formula

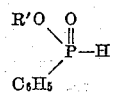

wherein R' is a member of the class consisting of, alkenyl, and chloroalkyl radicals.
9. Chloroethyl phenylphosphinate.
10. Beta-chloroethyl phenylphosphinate.

References Cited in the file of this patent

UNITED STATES PATENTS

| | | |
|---|---|---|
| 2,046,031 | Mugdan et al. | June 30, 1936 |
| 2,409,039 | Hardy et al. | Oct. 8, 1946 |
| 2,485,573 | Craig et al. | Oct. 25, 1949 |

FOREIGN PATENTS

| | | |
|---|---|---|
| 695,782 | Great Britain | Aug. 19, 1953 |